(12) United States Patent
Bradley et al.

(10) Patent No.: US 10,065,676 B2
(45) Date of Patent: Sep. 4, 2018

(54) SYSTEM FOR A TOWING VEHICLE (71) Applicant: Jaguar Land Rover Limited, Coventry (GB)

(72) Inventors: Andrew Bradley, Coventry (GB); Sebastian Paszkowicz, Coventry (GB); Harpreet Singh, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/784,220

(22) PCT Filed: Apr. 24, 2014

(86) PCT No.: PCT/WP2014/058387
§ 371 (c)(1),
(2) Date: Oct. 13, 2015

(87) PCT Pub. No.: WO2014/174037
PCT Pub. Date: Oct. 30, 2014

(65) Prior Publication Data
US 2016/0059888 A1    Mar. 3, 2016

(30) Foreign Application Priority Data

Apr. 26, 2013   (GB) .................................. 1307524.7

(51) Int. Cl.
*B62D 13/06*   (2006.01)
*B60T 7/22*   (2006.01)
(Continued)

(52) U.S. Cl.
CPC ............ *B62D 13/06* (2013.01); *B60D 1/245* (2013.01); *B60D 1/62* (2013.01); *B60R 1/00* (2013.01);
(Continued)

(58) Field of Classification Search
CPC ...... B62D 13/06; B62D 15/027; B60D 1/245; B60D 1/62; B60W 30/00; H04N 7/183; B60Q 9/005; G01B 7/30; B60R 1/003
(Continued)

(56) References Cited

U.S. PATENT DOCUMENTS 5,539,647 A * 7/1996 Shibata .................. G01C 21/28
                                                            701/472
6,226,389 B1   5/2001 Lemelson et al.
(Continued)

FOREIGN PATENT DOCUMENTS

DE           195 26 702 A1    2/1997
DE    10 2005 043 466 A1    3/2007
(Continued)

OTHER PUBLICATIONS

Combined Search and Examination Report, Application No. GB1307524.7, dated Oct. 28, 2013, 8 pages.
(Continued)

*Primary Examiner* — Anne Marie Antonucci
*Assistant Examiner* — Sanjeev Malhotra
(74) *Attorney, Agent, or Firm* — Myers Bigel, P.A.

(57)   ABSTRACT

The present invention relates to a vehicle control system (1) for controlling a trailer (5) coupled to a vehicle (3) during a reversing operation. The vehicle control system includes a processor (29) configured to determine an actual trailer travel direction ($T_{ACT}$) based on one or more sensor signals. The processor (29) receives a demanded trailer travel direction ($T_{DEM}$), for example from a user. A maximum permissible hitch angle ($\Phi_{MAX}$) is calculated by the processor (29) and the demanded trailer travel direction ($T_{DEM}$) is limited to an angle less than or equal to the calculated maximum permissible hitch angle ($\Phi_{MAX}$). The present invention also relates to a vehicle (3) incorporating the vehicle control
(Continued)

system (1); and a method of controlling the reversing of the trailer (5).

19 Claims, 5 Drawing Sheets

(51) Int. Cl.
*B62D 15/02* (2006.01)
*B60R 1/00* (2006.01)
*B60D 1/24* (2006.01)
*B60D 1/62* (2006.01)

(52) U.S. Cl.
CPC .............. *B60T 7/22* (2013.01); *B62D 15/021* (2013.01); *B62D 15/027* (2013.01); *B62D 15/028* (2013.01); *B62D 15/0275* (2013.01); *B60R 2300/806* (2013.01); *B60R 2300/808* (2013.01); *B60T 2230/08* (2013.01)

(58) Field of Classification Search
USPC .............. 701/1, 34.4, 36, 41, 42; 280/405.1, 280/438.1; 477/198; 705/14.46, 26.7; 340/932.2; 180/14.1, 252; 348/113; 702/145; 73/865.8; 324/207.2
See application file for complete search history.

(56) References Cited

U.S. PATENT DOCUMENTS

| | | | |
|---|---|---|---|
| 6,292,094 B1 | 9/2001 | Deng et al. | |
| 8,038,166 B1 | 10/2011 | Piesinger | |
| 8,191,915 B2 | 6/2012 | Freese et al. | |
| 2001/0027363 A1 | 10/2001 | Shimazaki et al. | |
| 2002/0036390 A1* | 3/2002 | Sargent | B60D 1/065 280/405.1 |
| 2002/0149673 A1 | 10/2002 | Hirama et al. | |
| 2005/0007143 A1 | 1/2005 | Ishigaki | |
| 2005/0074143 A1 | 4/2005 | Kawai | |
| 2009/0236825 A1 | 9/2009 | Okuda et al. | |
| 2010/0004095 A1* | 1/2010 | Sokoll | B60T 7/122 477/198 |
| 2010/0096203 A1 | 4/2010 | Freese et al. | |
| 2010/0332049 A1* | 12/2010 | Sy | B60T 8/1708 701/1 |
| 2011/0001614 A1 | 1/2011 | Ghneim | |
| 2011/0001825 A1 | 1/2011 | Hahn | |
| 2011/0210529 A1* | 9/2011 | Markstaller | B62D 53/0814 280/438.1 |
| 2011/0216199 A1 | 9/2011 | Trevino et al. | |
| 2012/0092191 A1* | 4/2012 | Stefik | G06Q 10/02 340/932.2 |
| 2012/0096490 A1* | 4/2012 | Barnes, Jr. | G06Q 10/02 725/34 |
| 2012/0271512 A1 | 10/2012 | Rupp et al. | |
| 2013/0020144 A1* | 1/2013 | Troy | B25J 5/007 180/252 |
| 2013/0226390 A1 | 8/2013 | Luo et al. | |
| 2014/0137673 A1* | 5/2014 | Troy | B25J 5/007 73/865.8 |
| 2014/0172232 A1* | 6/2014 | Rupp | B60W 30/18036 701/36 |
| 2014/0188344 A1* | 7/2014 | Lavoie | B60W 30/00 701/41 |
| 2014/0188346 A1* | 7/2014 | Lavoie | B62D 13/06 701/42 |
| 2014/0200759 A1 | 7/2014 | Lu et al. | |
| 2014/0210456 A1* | 7/2014 | Crossman | B62D 13/06 324/207.2 |
| 2014/0218506 A1* | 8/2014 | Trombley | B60R 1/003 348/113 |
| 2014/0236532 A1* | 8/2014 | Trombley | G01B 21/02 702/145 |
| 2014/0249691 A1* | 9/2014 | Hafner | B62D 13/06 701/1 |
| 2014/0249723 A1* | 9/2014 | Pilutti | B62D 15/027 701/42 |
| 2014/0267688 A1* | 9/2014 | Aich | H04N 7/181 348/113 |
| 2014/0267689 A1* | 9/2014 | Lavoie | H04N 7/183 348/113 |
| 2014/0277942 A1* | 9/2014 | Kyrtsos | G01B 21/02 701/41 |
| 2014/0288769 A1* | 9/2014 | Trombley | G06F 17/00 701/34.4 |
| 2014/0297128 A1* | 10/2014 | Lavoie | G01B 21/06 701/41 |
| 2014/0297129 A1* | 10/2014 | Lavoie | B62D 13/06 701/41 |
| 2014/0303849 A1* | 10/2014 | Hafner | B62D 13/06 701/42 |
| 2015/0149040 A1* | 5/2015 | Hueger | B62D 13/06 701/41 |
| 2016/0039456 A1* | 2/2016 | Lavoie | B62D 15/027 701/41 |
| 2016/0092962 A1* | 3/2016 | Wasserman | G06Q 30/0631 705/26.7 |
| 2016/0096637 A1* | 4/2016 | Troy | G01N 29/265 180/14.1 |
| 2016/0140614 A1* | 5/2016 | Brubaker | G06Q 30/02 705/14.46 |
| 2017/0174022 A1 | 6/2017 | Hu et al. | |

FOREIGN PATENT DOCUMENTS

| | | |
|---|---|---|
| DE | 10 2005 043 468 A1 | 3/2007 |
| DE | 10 2006 035 021 A1 | 1/2008 |
| DE | 102010035299 A1 | 2/2012 |
| DE | 10 2012 005 707 A1 | 10/2012 |
| EP | 1 231 110 A2 | 8/2002 |
| EP | 1 249 365 A1 | 10/2002 |
| GB | 2 447 672 A | 9/2008 |
| WO | WO 2005/021344 A1 | 3/2005 |
| WO | WO 2005/080179 A1 | 9/2005 |
| WO | WO 2008/148635 A1 | 12/2008 |
| WO | WO 2010/064989 A1 | 6/2010 |
| WO | WO 2011/158107 A1 | 12/2011 |
| WO | WO 2012/059207 A1 | 5/2012 |
| WO | WO 2012/103193 A1 | 8/2012 |
| WO | WO 2012/117693 A1 | 9/2012 |
| WO | WO 2013/130479 A1 | 9/2013 |

OTHER PUBLICATIONS

Combined Search and Examination Report, Application No. GB1307525.4, dated Oct. 23, 2013, 5 pages.
Combined Search and Examination Report, Application No. GB1307525.4, dated Jun. 10, 2014, 4 pages.
International Search Report, PCT/EP2014/058387, dated Sep. 10, 2014, 4 pages.
Notification of Transmittal of the International Search Report and the Written Opinion of the International Searching Authority, PCT/EP2014/058372, Sep. 10, 2014, 12 pages.
Notification of Transmittal of the International Search Report and the Written Opinion of the International Searching Authority, PCT/EP2014/058373, dated Aug. 11, 2014, 11 pages.
Search and Examination Report, Application No. GB1307524.7, dated Jun. 5, 2014, 6 pages.
Communication pursuant to Article 94(3) EPC, EP Application No. 14 719 026.8, dated Oct. 18, 2017, 6 pp.

* cited by examiner

SYSTEM FOR A TOWING VEHICLE

RELATED APPLICATIONS

This application is a 35 U.S.C. § 371 national stage application of PCT Application No. PCT/EP2014/058387, filed on Apr. 24, 2014, which claims priority from Great Britain Patent Application No. 1307524.7, filed on Apr. 26, 2013, the contents of which are incorporated herein by reference in their entireties. The above-referenced PCT International Application was published in the English language as International Publication No. WO 2014/174037 A1 on Oct. 30, 2014.

TECHNICAL FIELD

The present invention relates to a system for a towing vehicle; a human machine interface (HMI); a method of controlling a trailer coupled to a vehicle during a reversing operation; and a vehicle.

BACKGROUND OF THE INVENTION

It is known from GB 2447672 to provide a computing unit to calculate a hitch angle between a trailer and a vehicle. The computing unit uses image data from three video cameras, fitted respectively to the rear of the vehicle and one on each door mirror, to track the position of a trailer-mounted marker to determine the position of the trailer relative to the vehicle. The computing unit can also predict a trailer path and this is output to the driver on a display as guide lines overlaid onto a camera view.

At least in certain embodiments, the present invention aims to provide an improved system.

SUMMARY OF THE INVENTION

Aspects of the present invention relate to a system; a human machine interface (HMI); a method of controlling a trailer coupled to a vehicle during a reversing operation; and a vehicle.

According to a further aspect of the present invention there is provided a vehicle control system for reversing a trailer coupled to a vehicle, the vehicle control system comprising a processor configured to:
determine an actual trailer travel direction based on one or more sensor signals;
receive a demanded trailer travel direction; and
calculate a maximum permissible hitch angle;
wherein the processor is configured to limit the demanded trailer travel direction to an angle less than or equal to the calculated maximum permissible hitch angle. The demanded trailer travel direction represents a target trailer travel direction and is typically user-generated. By limiting the range of trailer travel direction that can be demanded by the user, the vehicle control system can prevent the user from demanding a trailer travel direction which exceeds the maximum permissible hitch angle. In use, the control system can prevent the actual trailer travel direction increasing above the maximum permissible hitch angle.

The maximum permissible hitch angle typically corresponds to or is based on a jack-knife angle of the trailer. The jack-knife angle is the angle above which the hitch angle cannot be reduced by reversing the vehicle. The vehicle control system can help to avoid the trailer jack-knifing while it is being reversed. The processor can be configured to output a maximum hitch angle signal based on the calculated angle. The maximum permissible hitch angle could be smaller than the jack-knife angle of the trailer to introduce an error margin. The maximum permissible hitch angle could be defined as the jack-knife angle of the trailer less a pre-defined angular offset. The pre-defined angular offset could be 1°, 2°, 5° or 10°, for example. Alternatively, the maximum permissible hitch angle could be a function of the jack-knife angle of the trailer, for example substantially equal to 95%, 97% or 99% of the calculated jack-knife angle.

The processor can be configured to estimate a distance to be travelled by the vehicle at least substantially to match the actual trailer travel direction with the demanded trailer travel direction. This aspect of the present invention is believed to be patentable independently.

According to a further aspect of the present invention there is provided a vehicle control system for reversing a trailer coupled to a vehicle, the vehicle control system comprising a processor configured to:
determine an actual trailer travel direction based on one or more sensor signals;
receive a demanded trailer travel direction; and
estimate a distance to be travelled by the vehicle at least substantially to match the actual trailer travel direction with the demanded trailer travel direction. The processor can predict the convergence of the actual trailer travel direction and the demanded trailer travel direction. The processor can be configured to output a distance signal based on the estimated distance to be travelled.

The processor can be configured to calculate a maximum permissible hitch angle. The processor can optionally also be configured to limit the demanded trailer travel direction to an angle less than or equal to said maximum permissible hitch angle.

The system can comprise a display operative to display system information based on the output(s) from said processor. The display can be in communication with said processor. The system information can be displayed as an overlay on a video image, for example a video image from one or more reversing cameras. The display can be operative to display one or more of the following:
(a) the actual trailer travel direction;
(b) the demanded trailer travel direction;
(c) a numerical or graphical indication of the estimated distance to be travelled;
(d) a location where the actual trailer travel direction will at least substantially match the demanded trailer travel direction.
(e) an angular offset between said actual trailer travel direction and said demanded trailer travel direction;
(f) the maximum permissible hitch angle;
(g) a current steering angle; and
(h) one or more trajectory lines representing a predicted path of the vehicle and/or the trailer.

The actual trailer travel direction can be indicated by a first arrow. The first arrow could be a vector arranged to display both the direction of trailer travel and also the velocity (magnitude) of the trailer travel. The demanded trailer travel direction can be indicated by a second arrow. The first arrow and the second arrow can extend radially from a common origin, for example positioned along a centre line of the vehicle. The origin can be overlaid onto the video image to coincide with the position of the tow bar of the vehicle.

The current hitch angle could be displayed. The angular velocity (degrees/second) at which the hitch angle is changing could also be displayed, for example as a (positive/negative) numerical value and/or a graphical symbol, such as an arrow, representing direction (clockwise or counter-clockwise) and/or magnitude. The maximum permissible hitch angle can be displayed as a marker, such as a continuous line or a dashed line. The maximum permissible hitch angle can be displayed for both clockwise and counter-clockwise directions.

The trajectory line(s) can represent a predicted path of the vehicle and/or the trailer. For example, a pair of parallel trajectory lines can be displayed to represent the path followed by the wheels of the vehicle and/or the trailer. The location where the actual trailer travel direction will at least substantially match the demanded trailer travel direction could be displayed by a marker or symbol on said trajectory line(s).

A steering angle of the vehicle could be controlled manually. The estimated distance could, for example, be calculated based on a current steering angle selected by the user. The user could optionally determine the optimum steering angle by rotating the steering wheel to identify the minimum estimated distance. The control system could be configured to output prompts to the user to control the steering angle, for example to request that the driver increases or decreases the steering angle.

Alternatively, the steering angle can be controlled automatically. The processor can be configured to output a steering control signal to control a steering angle of the vehicle. The steering control signal can be output to an electronic power assisted steering (EPAS) module. The angular velocity of changes in the vehicle steering angle (degrees/second) can be adjusted in proportion to the vehicle speed. The vehicle speed can be controlled automatically, for example as a further function of the processor. Alternatively, the vehicle speed can be controlled by the driver, for example by providing acceleration and braking inputs using the vehicle controls. When the vehicle control system is operating to match the actual and demanded trailer travel directions, the processor can be configured to limit the speed of the vehicle and/or to limit the acceleration of the vehicle.

The processor can be configured to calculate a rate of convergence of the actual trailer travel direction and said demanded trailer travel direction. The display system can be operative to display the rate of convergence. The rate of convergence could be displayed as a numerical representation and/or a graphical representation.

The image system can comprise one or more optical cameras disposed on said vehicle and/or said trailer. The processor can be configured to receive proximity data from other sensors, for example ultrasonic sensors or radar disposed on the vehicle and/or the trailer.

The demanded trailer travel direction can be specified by a user. The demanded trailer travel direction could be specified using the steering wheel of the vehicle; or an input device other than the steering wheel. For example, the input device can comprise an input for an on-board information/entertainment (infotainment) system. The input device can comprise a rotary knob, a jog switch/wheel, a touchscreen, a touch panel, a joystick or the like. In alternate embodiments, the demanded trailer travel direction could be set using the vehicle steering wheel.

The system can be implemented as a component of a human machine interface (HMI). The display and/or the input device can form part of the HMI. According to a still further aspect of the present invention, there is provided a HMI comprising a vehicle control system as described herein. The HMI can be configured to inhibit or prevent selection of a demanded trailer travel direction exceeding the calculated maximum permissible hitch angle.

According to a further aspect of the present invention there is provided a system for reversing a trailer coupled to a vehicle, the vehicle control system comprising a processor and a display system, the processor being configured to:
  determine an actual trailer travel direction based on one or more sensor signals; and
  receive a demanded trailer travel direction;
  wherein the display system is operative simultaneously to display the actual trailer travel direction and the demanded trailer travel direction. The processor can also be configured to calculate a maximum permissible hitch angle. The display system can be operative to display the maximum permissible hitch angle at the same time as the actual and demanded trailer travel directions. The maximum permissible hitch angle can correspond to or be based on the jack-knife angle of the trailer.

According to a still further aspect of the present invention there is provided a method of controlling a trailer coupled to a vehicle during a reversing operation, the method comprising:
  determining an actual trailer travel direction based on one or more sensor signals;
  receiving a demanded trailer travel direction; and
  calculating a maximum permissible hitch angle;
  wherein the method comprises limiting the demanded trailer travel direction to an angle less than or equal to the calculated maximum permissible hitch angle. The method can comprise displaying the maximum permissible hitch angle on a display. The maximum permissible hitch angle can be overlaid onto a video image, for example from a rearward facing camera. The method can comprise displaying the demanded trailer travel direction and/or the actual trailer travel direction on said display.

According to a yet further aspect of the present invention there is provided a method of controlling a trailer coupled to a vehicle during a reversing operation, the method comprising:
  determining an actual trailer travel direction based on one or more sensor signals;
  receiving a demanded trailer travel direction; and
  estimating a distance to be travelled by the vehicle at least substantially to match the actual trailer travel direction with the demanded trailer travel direction.

The methods described herein can each be computer-implemented, for example on a computational apparatus comprising one or more microprocessors. According to a yet further aspect of the present invention there is provided a computer program product comprising a computer readable storage medium including computer readable program code, where the computer readable program code when executed on a computer causes the computer to perform the method(s) described herein.

The term processor used herein is to be understood as covering both single processors and multiple processors.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

A system 1 for assisting with the reversing of a vehicle 3 and a trailer 5 in accordance with an embodiment of the present invention will now be described with reference to FIGS. 1 to 4.

The system is operable to facilitate reversing of the trailer 5 when it is coupled to the vehicle 3 (the combination of the vehicle 3 and the trailer 5 can be referred to as 'a rig'). More specifically, the system 1 is configured to control the steering of the vehicle 3 such that the trailer 5 is reversed in a direction specified by the user. In the present embodiment, the operation of the throttle and brakes of the vehicle 3 are controlled by the user.

Figure 1:
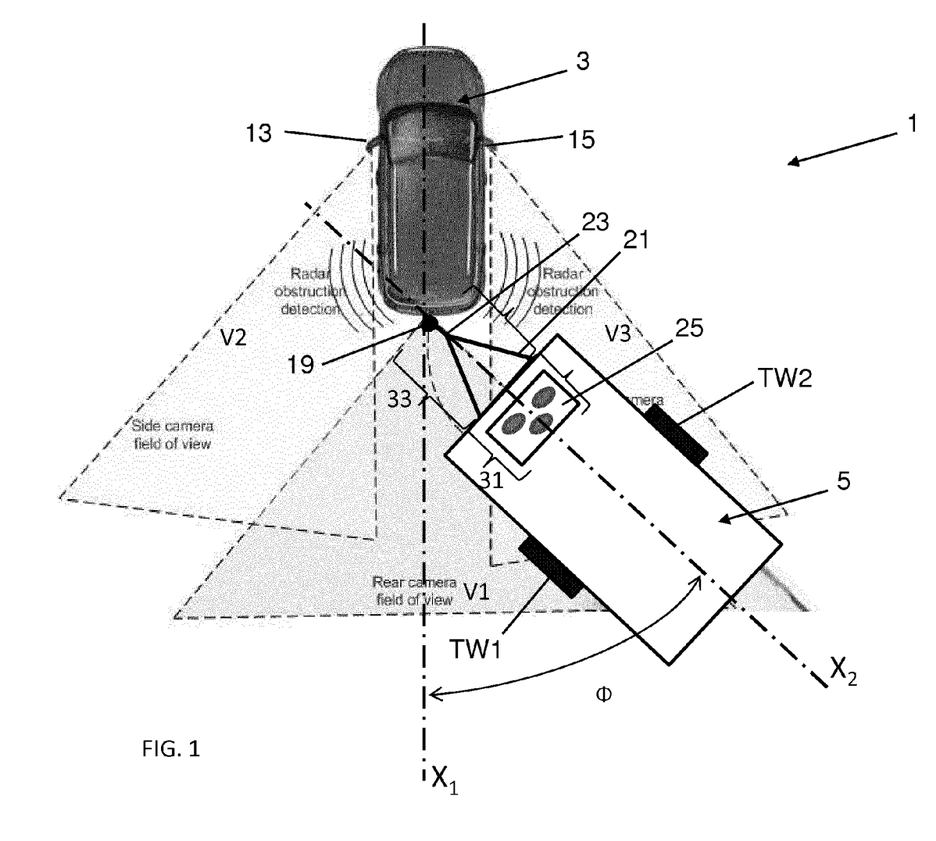
FIG. 1 shows a plan view of a trailer coupled to a vehicle incorporating a system in accordance with an embodiment of the present invention.

A plan view of the vehicle 3 and the trailer 5 are shown in FIG. 1. The vehicle 3 has four wheels W1-4 and the front wheels W1, W2 of the vehicle 3 are steerable in conventional manner. The trailer 5 has two wheels TW1, TW2 having a fixed orientation.

Figure 2:
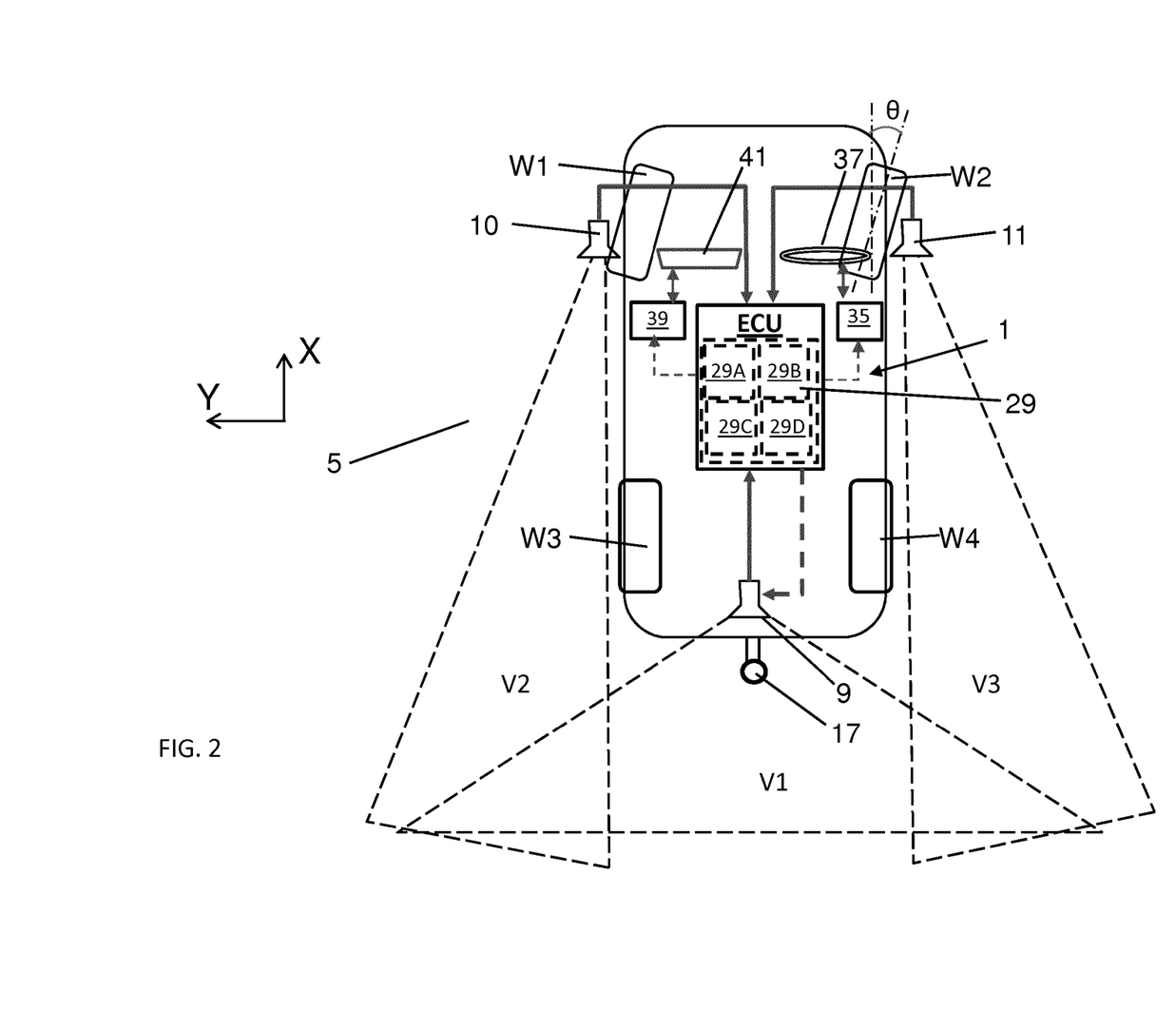
FIG. 2 shows a schematic representation of the vehicle and the system in accordance with an embodiment of the present invention.

As shown in FIG. 2, the vehicle 3 is provided with an imaging system comprising a centrally mounted rear camera 9; and left and right side cameras 10, 11 mounted in respective wing mirrors 13, 15. The cameras 9, 10, 11 are optical cameras arranged to face to the rear of the vehicle 3 and their fields of view V1, V2, V3 are illustrated by dashed triangles in FIG. 1. The vehicle 3 optionally also comprises an obstruction detection system, for example side radar systems for detecting the presence of obstructions in the rear three quarters position of the vehicle 3.

A tow hitch 17 is mounted to the vehicle 3 for coupling to a trailer coupling 19 mounted to the trailer 5. The tow hitch 17 is an upwardly projecting tow ball in the present embodiment. The trailer coupling 19 is mounted to a hitch frame 21 disposed at the front of the trailer 5. In the present embodiment, the hitch frame 21 is an A-frame having a front apex 23 to which the trailer coupling 7 is mounted. A target 25 is mounted to a front face 27 of the trailer 5 to enable the position of the trailer 5 relative to the vehicle 3 to be determined, as described herein. The target 25 is a visible image comprising three circles arranged in a triangular formation. It will be appreciated that the present invention can be implemented with other targets 25, for example comprising different symbols/images or non-visible targets.

The system 1 comprises an electronic control unit (ECU) having an electronic processor 29. The processor 29 comprises image processing means in the form of an image processing module 29A for analysing the image data. The cameras 9, 10, 11 each output image data to the image processing module 29A for analysis. In use, the image processing module 29A analyses the image data to identify feature sets corresponding to predefined features. In the present embodiment, the target 25 defines a first feature set 31 and the hitch frame 21 defines a second feature set 33. The image processing module 29A identifies the first feature set 31 and/or the second feature set 33 within the image data to determine the position and orientation of the trailer 5 in relation to the vehicle 3.

The first feature set 31 can be defined in a target geometry file; and the second feature set 33 can be defined in a trailer geometry file. The geometry files can both be stored on a storage medium accessible to the processor 29. The target geometry file can be predefined, for example to define a specific target design supplied by the vehicle manufacturer. The trailer geometry file can comprise data defining the geometry of the hitch frame 21 and optionally also the length and/or wheelbase of the trailer 5. A plurality of trailer geometry files can be stored, for example to represent different sizes/configurations of trailers 5. The system 1 can allow a user to select a predefined trailer model or to define a custom trailer model.

The processor 29 further comprises vehicle/trailer guidance means in the form of a guidance module 29B. The guidance module 29B is provided to assist with guiding the trailer 5 when the vehicle 3 and the trailer 5 are being reversed together. In particular, the guidance module 29B is configured to control a steering angle θ of the front wheels W1, W2 of the vehicle 3 to guide the trailer 5 in a demanded trailer travel direction $T_{DEM}$. As described herein, the demanded travel direction $T_{DEM}$ is defined by the user and represents a target direction of travel for the trailer 5.

The vehicle 3 has a first longitudinal axis X1 and the trailer 5 has a second longitudinal axis X2. The angular offset between the first and second longitudinal axes X1, X2 is referred to as the hitch angle φ. During reversing, the trailer 5 travels in a direction $T_{ACT}$ corresponding to the hitch angle φ (unless the hitch angle φ exceeds a jack-knife angle for the trailer 5, as described herein).

The image processing module 29A calculates the hitch angle φ, with reference to said first feature set 31 and/or said second feature set 33, and outputs a hitch angle signal to the guidance module 29B. When reversing, the guidance module 29B calculates the required steering angle θ based on the following equation:

$$\theta_{t+1}=\theta_t+\min(\max(k(\phi_{req}-\phi_{cur}),-\alpha),\alpha)$$

Where:
 $\theta_{t+1}$ and $\theta_t$ are the steering angles of the vehicle 3 at frame t+1 and t (auto steering command from the algorithm and current steering from the CAN respectively);
 $\phi_{req}$ and $\phi_{cur}$ are the requested and current hitch angles;
 α is the maximum steering offset value; and
 k is a constant multiplier.

Figure 3:
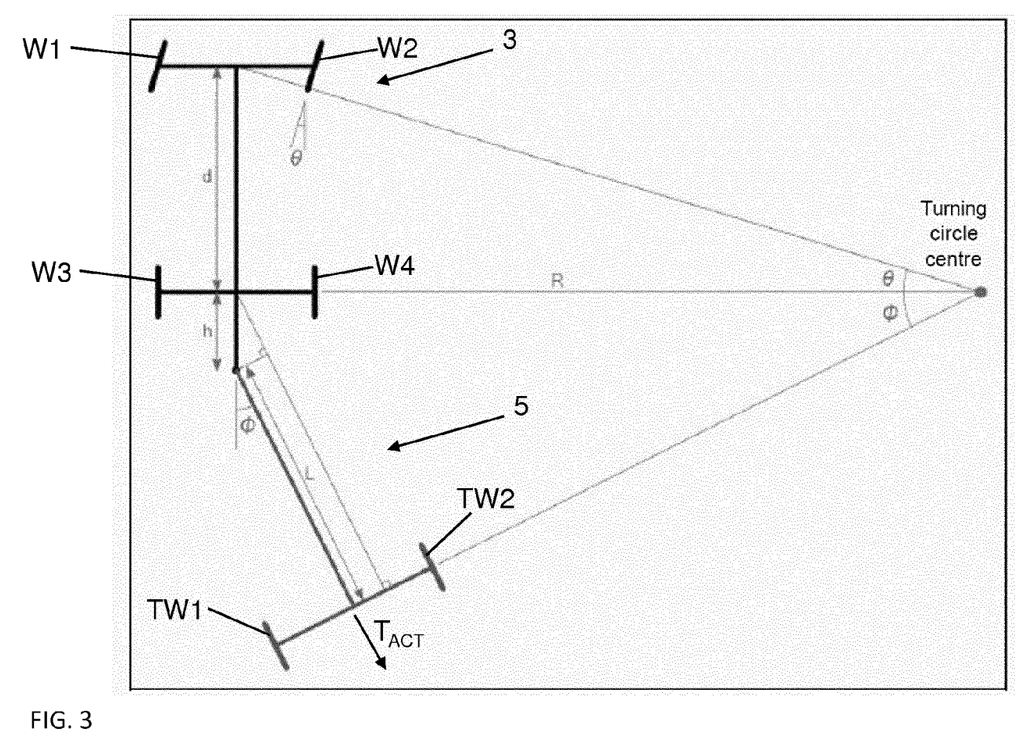
FIG. 3 illustrates the vehicle and trailer dimensions and associated nomenclature.

The value of the gain k can be calculated based on the relationship between θ and φ, as shown in FIG. 3. When the trailer hitch length L plus the towbar offset of the vehicle h is equal to the vehicle wheelbase d, then the relationship between θ and φ is one (1) for small angles and so the gain k can be set to a value of one (1). The gain k can therefore be calculated based on the following equation:

$$k = \frac{L+h}{d}$$

Where:
L is the hitch length of the trailer 5;
h is the tow bar offset of the vehicle 3;
d is the wheelbase of the vehicle 3;

The gain k thereby compensates for the fact that longer trailers take longer to reach the requested hitch angle $\phi$.

The guidance module 29B is configured to calculate a maximum permissible hitch angle $\phi_{MAX}$. If the hitch angle $\phi$ exceeds the maximum permissible hitch angle $\phi_{MAX}$ (which in the present embodiment is the jack-knife angle of the trailer 5), it is no longer possible to reduce the hitch angle $\phi$ by continuing to reverse (i.e. the trailer 5 has jack-knifed). With reference to FIG. 3, the guidance module 29B calculates the maximum permissible hitch angle $\phi_{MAX}$ by applying the following set of equations:

$$R = \frac{d}{\tan(\theta)}$$

$$\phi = \cos^{-1}\left(\frac{-Lh + R\sqrt{R^2 + h^2 - L^2}}{R^2 + h^2}\right) \text{ for positive } \theta$$

$$\phi = -\cos^{-1}\left(\frac{-Lh - R\sqrt{R^2 + h^2 - L^2}}{R^2 + h^2}\right) \text{ for negative } \theta$$

Where:
R is the turning radius;
$\theta$ is the steering angle of the vehicle 3;
d is the wheelbase of the vehicle 3;
h is the tow bar offset of the vehicle 3;
L is the hitch length of the trailer 5;

The wheelbase d, the tow bar offset h and the maximum steering angle $\theta_{MAX}$ of the vehicle 3 are defined for the vehicle 3. The hitch length L of the trailer 5 is entered during trailer setup by the user (or can be determined during a calibration exercise). The guidance module 29B outputs a maximum hitch angle signal to indicate the maximum permissible hitch angle $\phi_{MAX}$ for the current steering angle $\theta$. The guidance module 29B is configured to inhibit the selection of a demanded trailer travel direction $T_{DEM}$ which is greater than the maximum permissible hitch angle $\phi_{MAX}$.

The guidance module 29B is configured to calculate the distance to be travelled by the vehicle 3 before the actual trailer travel direction matches the demanded trailer travel direction $T_{DEM}$. The distance is calculated based on a predictive path algorithm which models the path to be followed by the vehicle 3. The guidance module 29B calculates the initial required steering angle $\theta$ to achieve the desired hitch angle $\phi$, then iteratively calculates the required steering angle $\theta$ and hitch angle $\phi$. The distances to be travelled by the vehicle 3 between each of the iterations are then summed to provide the total distance to be travelled. The guidance module 29B outputs a distance signal to indicate the distance to be travelled by the vehicle 3.

In use, the guidance module 29B is configured to output a steering control signal operative to control the steering angle $\theta$ of the front wheels W1, W2 to adjust the hitch angle $\phi$, thereby modifying the actual trailer travel direction. Specifically, the guidance module 29B adjusts the steering angle $\theta$ (which can be positive or negative in relation to a reference point) to increase or decrease the hitch angle $\phi$. The actual trailer travel direction $T_{ACT}$ can thereby be matched to the demanded trailer travel direction $T_{DEM}$ specified by the user. The hitch angle signal is updated at least substantially in real time and the guidance module 29B makes corresponding real time adjustments to the steering control signal. The guidance module 29B controls the hitch angle $\phi$ so that the difference between $T_{ACT}$ and $T_{DEM}$ is at least substantially zero. A tolerance of +/-0.5° between $T_{ACT}$ and $T_{DEM}$ provides a good result.

The guidance module 29B can generate a control sequence to reduce or minimise the distance travelled by the vehicle 3 and the trailer 5 to achieve the demanded trailer travel direction $T_{DEM}$.

The steering angle control signal is output to an electronic power assisted steering (EPAS) module 35 to control the angle of a steering wheel 37 to provide a required steering angle $\theta$ for the front wheels W1, W2. The EPAS module 35 automatically adjusts the angular orientation of the steering wheel 37 to provide the appropriate steering angle $\theta$ at the front wheels W1, W2 to control the vehicle 3 to match the actual trailer travel direction $T_{ACT}$ with the demanded trailer travel direction $T_{DEM}$.

Figure 4:
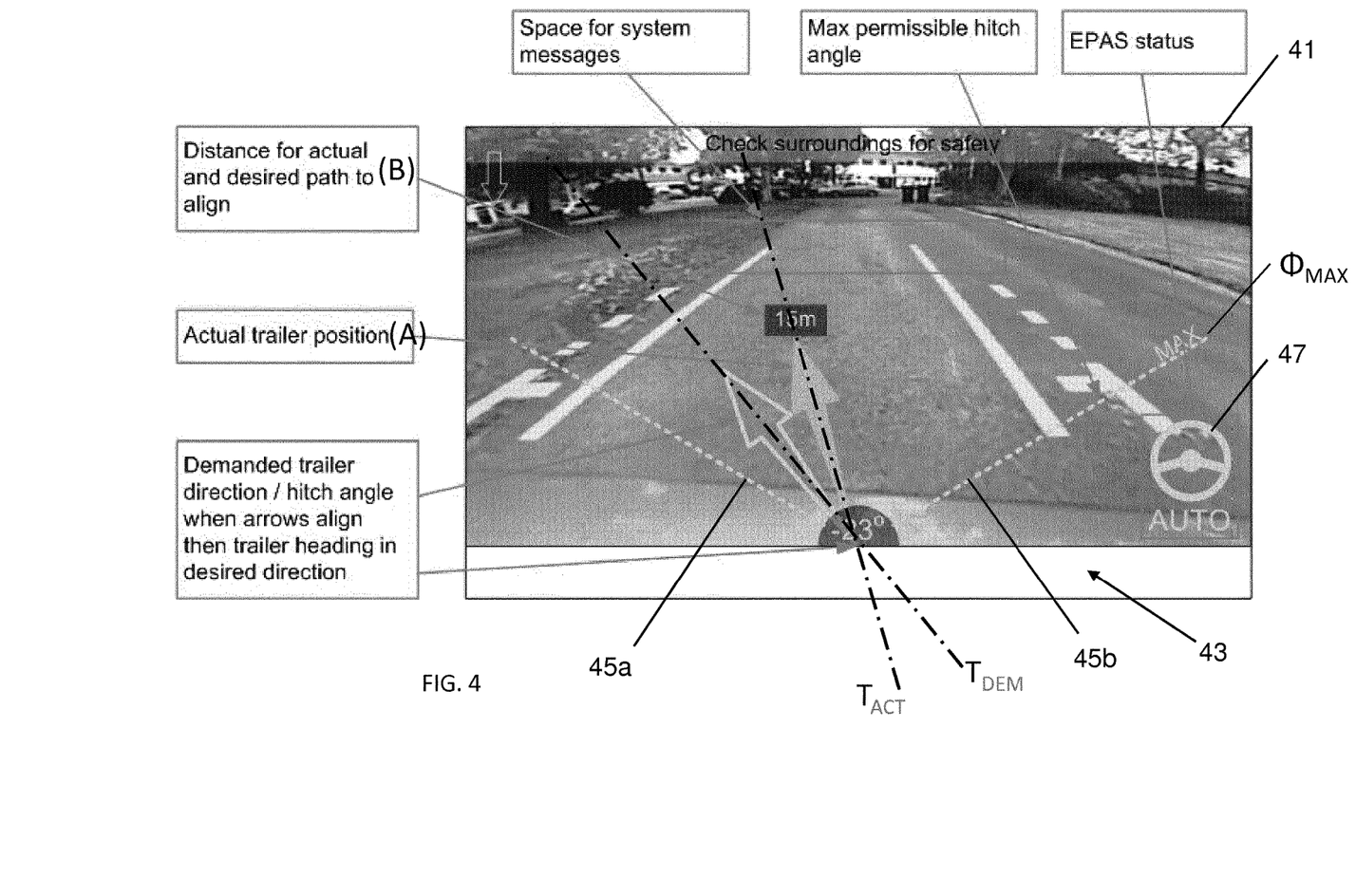
FIG. 4 shows a first display image from a rear camera mounted to the vehicle with information overlaid onto the video image to facilitate reversing the trailer (which is omitted from the image for clarity)

The system 1 comprises a human machine interface (HMI) module 39. The HMI module 39 is coupled to a display screen 41 which displays a video image 43 from the rear camera 9 (or a composite image derived from the image data for each of the cameras 9, 10, 11). As shown in FIG. 4, the HMI module 39 is configured to overlay graphical symbols over the video image 43. In the present embodiment, the HMI module 39 displays a first arrow A to indicate the actual trailer travel direction $T_{ACT}$; and a second arrow B to indicate the demanded trailer travel direction $T_{DEM}$. The user can adjust the demanded trailer travel direction $T_{DEM}$ by varying the orientation of the second arrow B using an input device in communication with the HMI module 39. In the present embodiment, the input device is a rotary knob forming part of the vehicle infotainment system.

In addition to displaying the first and second arrows A, B, the HMI module 39 receives the maximum hitch angle signal from the guidance module 29B. The HMI module 39 displays the maximum permissible hitch angle $\phi_{MAX}$ on the display screen 41 as an overlay of the video image 43 from the rear camera 9. As illustrated in FIG. 4, the maximum permissible hitch angle $\phi_{MAX}$ in clockwise (+ve) and counter-clockwise (-ve) directions are displayed as first and second dashed lines 45a, 45b. The guidance module 29B inhibits selection of a demanded trailer travel direction $T_{DEM}$ which is greater than the maximum permissible hitch angle $\phi_{MAX}$. This restriction on the demanded trailer travel direction $T_{DEM}$ is applied by the HMI module 39 which prevents the second arrow B being oriented at an angle greater than the maximum permissible hitch angle $\phi_{MAX}$.

The guidance module 29B outputs the steering angle control signal to the HMI module 39 and the current steering angle $\theta$ is represented by a steering wheel symbol 47 which representing the steering wheel 37. The angular orientation of the steering wheel symbol 47 provides an approximate representation of the angular orientation of the steering wheel 37. A numerical indication of the steering angle could be displayed instead of, or in addition to, the steering wheel symbol 47.

Figure 5:
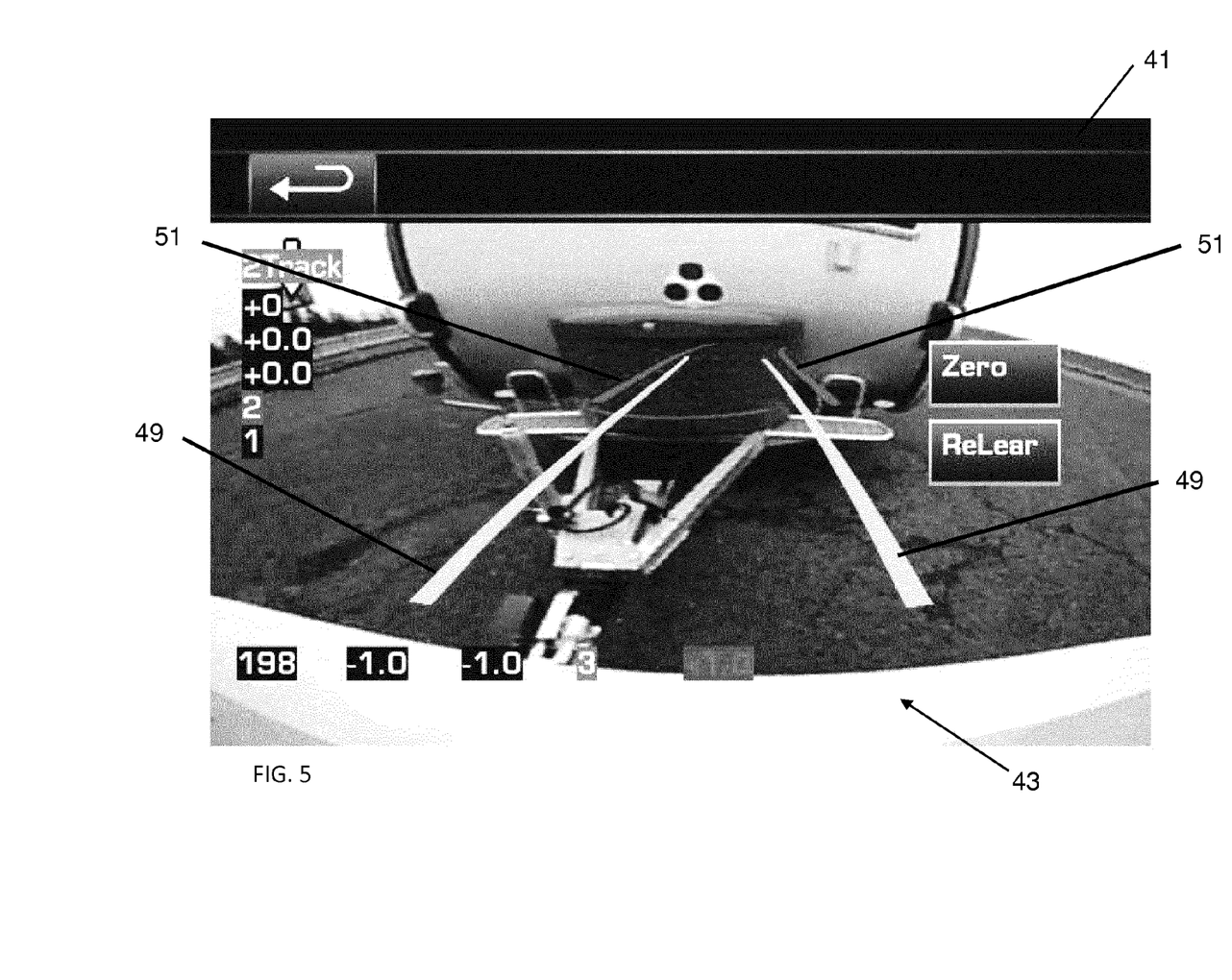
FIG. 5 shows a second display image from the rear camera with an alternate set of information overlaid onto the video image.

The HMI module 39 is configured to overlay a predicted vehicle trajectory onto the video image 43. As shown in FIG. 5, the HMI module 39 displays a first pair of parallel lines 49 representing the predicted trajectory of the vehicle 3; and a second pair or parallel lines 51 representing the predicted trajectory of the trailer 5.

The present invention is applicable to a range of different types of trailer 5. For example, the trailer 5 can be a caravan, a goods trailer, a flatbed trailer, a van trailer, a livestock trailer and so on. Similarly, the present invention is applicable to a range of different types of vehicles 3. For example, the vehicle 3 can be a motor vehicle, such as an off-road or sports utility vehicle; or a towing engine or tractor for a semi-trailer truck.

It will be appreciated that various changes and modifications can be made to the system 1 described herein without departing from the present invention. Further aspects of the present invention are set out in the following numbered paragraphs:

1. A vehicle control system for reversing a trailer coupled to a vehicle, the vehicle control system comprising a processor configured to:
   determine an actual trailer travel direction based on one or more sensor signals;
   receive a demanded trailer travel direction; and
   calculate a maximum permissible hitch angle;
   wherein the processor is configured to limit the demanded trailer travel direction to an angle less than or equal to the calculated maximum permissible hitch angle.

2. A vehicle control system as described in paragraph 1, wherein the processor is configured to estimate a distance to be travelled by the vehicle at least substantially to match the actual trailer travel direction with the demanded trailer travel direction.

3. A vehicle control system for reversing a trailer coupled to a vehicle, the vehicle control system comprising a processor configured to:
   determine an actual trailer travel direction based on one or more sensor signals;
   receive a demanded trailer travel direction; and
   estimate a distance to be travelled by the vehicle at least substantially to match the actual trailer travel direction with the demanded trailer travel direction.

4. A vehicle control system as described in paragraph 3, wherein the processor is configured to calculate a maximum permissible hitch angle; and, optionally, also to limit the demanded trailer travel direction to an angle less than or equal to said maximum permissible hitch angle.

5. A vehicle control system as described in paragraph 1 further comprising a display in communication with said processor and operative to display system information for a driver.

6. A vehicle control system as described in paragraph 5, wherein the display is operative to display one or more of the following:
   (a) the actual trailer travel direction;
   (b) the demanded trailer travel direction;
   (c) a numerical or graphical indication of the estimated distance to be travelled;
   (d) a location where the actual trailer travel direction will at least substantially match the demanded trailer travel direction.
   (e) an angular offset between said actual trailer travel direction and said demanded trailer travel direction;
   (f) the maximum permissible hitch angle;
   (g) a current steering angle;
   (h) one or more trajectory lines representing a predicted path of the vehicle and/or the trailer.

7. A vehicle control system as described in paragraph 1, wherein the processor is configured to output a steering control signal to control a steering angle of the vehicle.

8. A vehicle control system as described in paragraph 7, wherein the processor is configured to output the steering control signal to an electronic power assisted steering (EPAS) module.

9. A vehicle control system as described in paragraph 1, wherein the demanded trailer travel direction is specified by a user.

10. A vehicle comprising a vehicle control system as described in paragraph 1.

11. A method of controlling a trailer coupled to a vehicle during a reversing operation, the method comprising:
   determining an actual trailer travel direction based on one or more sensor signals;
   receiving a demanded trailer travel direction; and
   calculating a maximum permissible hitch angle;
   wherein the method comprises limiting the demanded trailer travel direction to an angle less than or equal to the calculated maximum permissible hitch angle.

12. A method as described in paragraph 11 comprising outputting a steering control signal to control a steering angle of the vehicle.

13. A method as described in paragraph 12, wherein the steering control signal is output to an electronic power assisted steering (EPAS) module to provide automated control of the steering angle of the vehicle.

14. A method of controlling a trailer coupled to a vehicle during a reversing operation, the method comprising:
   determining an actual trailer travel direction based on one or more sensor signals;
   receiving a demanded trailer travel direction; and
   estimating a distance to be travelled by the vehicle at least substantially to match the actual trailer travel direction with the demanded trailer travel direction.

15. A method as described in paragraph 14 comprising displaying a numerical or graphical indication of the estimated distance to be travelled by the vehicle.

The invention claimed is:

1. A system for a vehicle having a trailer coupled thereto, the system comprising a processor configured to:
   determine an actual trailer travel direction based on one or more sensor signals;
   receive a demanded trailer travel direction;
   estimate a distance to be travelled by the vehicle at least substantially to match the actual trailer travel direction with the demanded trailer travel direction;
   output a distance signal based on the estimated distance to be travelled; and
   output a steering control signal to control a steering angle of the vehicle.

2. The system as claimed in claim 1, wherein the processor is configured to calculate a maximum permissible hitch angle and to limit the demanded trailer travel direction to an angle less than or equal to said maximum permissible hitch angle.

3. The system as claimed in claim 2, wherein the processor is configured to inhibit or prevent selection of a demanded trailer travel direction exceeding the calculated maximum permissible hitch angle.

4. The system as claimed in claim 1, comprising a display in communication with said processor and operative to display system information for a driver.

5. The system as claimed in claim 4, wherein the display is operative to display one or more of the following:
   (a) the actual trailer travel direction;

(b) the demanded trailer travel direction;
(c) a numerical or graphical indication of the estimated distance to be travelled;
(d) a location where the actual trailer travel direction will at least substantially match the demanded trailer travel direction;
(e) an angular offset between said actual trailer travel direction and said demanded trailer travel direction;
(f) a maximum permissible hitch angle;
(g) a current steering angle;
(h) one or more trajectory lines representing a predicted path of the vehicle and/or the trailer.

6. The system as claimed in claim 1, wherein the processor is configured to output the steering control signal to an electronic power assisted steering (EPAS) module.

7. The system as claimed in claim 1, wherein the demanded trailer travel direction is specified by a user.

8. The system as claimed in claim 1, wherein the processor is configured to predict convergence of the actual trailer direction and the demanded trailer travel direction.

9. The system as claimed in claim 1, wherein the processor is configured to calculate a rate of convergence of the actual trailer travel direction and said demanded trailer travel direction.

10. The system as claimed in claim 1, wherein the processor is configured to output a speed control signal to control a speed of the vehicle.

11. The system as claimed in claim 10, wherein the processor is configured to limit the speed of the vehicle and/or an acceleration of the vehicle when the system is operating to match the actual and demanded trailer travel directions.

12. The system as claimed in claim 1, wherein the processor is configured to adjust an angular velocity of changes in the vehicle steering angle in proportion to speed of the vehicle.

13. The system as claimed in claim 1, wherein the processor is further configured to estimate the distance to be travelled based on a current steering angle.

14. The system as claimed in claim 1, wherein the processor is further configured to generate a control sequence to reduce or minimize the distance travelled by the vehicle and the trailer to achieve the demanded trailer travel direction.

15. A vehicle having a trailer coupled thereto, the vehicle comprising:
a system comprising a processor configured to:
determine an actual trailer travel direction based on one or more sensor signals;
receive a demanded trailer travel direction;
estimate a distance to be travelled by the vehicle at least substantially to match the actual trailer travel direction with the demanded trailer travel direction;
output a distance signal based on the estimated distance to be travelled; and
output a steering control signal to control a steering angle of the vehicle.

16. A method of operating a vehicle coupled to a trailer during a reversing operation, the method comprising:
determining, via a processor, an actual trailer travel direction based on one or more sensor signals;
receiving, via the processor, a demanded trailer travel direction;
estimating, via the processor, a distance to be travelled by the vehicle at least substantially to match the actual trailer travel direction with the demanded trailer travel direction; and
outputting, via the processor, a distance signal based on the estimated distance to be travelled and a steering control signal to control a steering angle of the vehicle.

17. The method as claimed in claim 16, comprising displaying a numerical or graphical indication of the estimated distance to be travelled by the vehicle.

18. A processor for a vehicle having a trailer coupled thereto, the processor programmed to:
receive one or more sensor signals to determine an actual trailer travel direction;
receive a demanded trailer travel direction;
estimate a distance to be travelled by the vehicle at least substantially to match the actual trailer travel direction with the demanded trailer travel direction;
output a distance signal based on the estimated distance to be travelled; and
output a steering control signal to control a steering angle of the vehicle.

19. A computer program product for operating a vehicle coupled to a trailer during a reversing operation, the computer program product comprising a non-transitory computer readable storage medium having encoded thereon instructions that, when executed on a processor, cause the processor to perform operations comprising:
determining an actual trailer travel direction based on one or more sensor signals;
receiving a demanded trailer travel direction;
estimating a distance to be travelled by the vehicle at least substantially to match the actual trailer travel direction with the demanded trailer travel direction;
outputting a distance signal based on the estimated distance to be travelled; and
outputting a steering control signal to control a steering angle of the vehicle.

* * * * *